US010054948B2

(12) United States Patent
Teshima et al.

(10) Patent No.: US 10,054,948 B2
(45) Date of Patent: Aug. 21, 2018

(54) VEHICLE CONTROL APPARATUS

(71) Applicant: DENSO CORPORATION, Kariya, Aichi-pref. (JP)

(72) Inventors: Kentaro Teshima, Kariya, Aichi-pref. (JP); Tetsuya Hara, Kariya, Aichi-pref. (JP); Daisuke Takemori, Kariya, Aichi-pref. (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/522,679

(22) PCT Filed: Oct. 27, 2015

(86) PCT No.: PCT/JP2015/005389
§ 371 (c)(1),
(2) Date: Apr. 27, 2017

(87) PCT Pub. No.: WO2016/067593
PCT Pub. Date: May 6, 2016

(65) Prior Publication Data
US 2017/0322558 A1    Nov. 9, 2017

(30) Foreign Application Priority Data

Oct. 31, 2014  (JP) .................................. 2014-223019

(51) Int. Cl.
*B60W 10/18* (2012.01)
*G05D 1/02* (2006.01)
(Continued)

(52) U.S. Cl.
CPC ........... *G05D 1/0214* (2013.01); *B60W 10/18* (2013.01); *B60W 10/20* (2013.01); *B60W 30/09* (2013.01);
(Continued)

(58) Field of Classification Search
CPC .. G05D 1/0214; G05D 1/0061; G05D 1/0088; G05D 1/0248; G05D 1/0255;
(Continued)

(56) References Cited

U.S. PATENT DOCUMENTS

2011/0202218 A1* 8/2011 Yano .......................... B60L 3/12
701/22
2012/0109435 A1* 5/2012 Mikulec .................... B60K 6/48
701/22

FOREIGN PATENT DOCUMENTS

JP        2000-301963 A    10/2000
JP        2007-331652 A    12/2007
(Continued)

*Primary Examiner* — Richard M Camby
(74) *Attorney, Agent, or Firm* — Knobbe, Martens, Olson & Bear, LLP

(57) ABSTRACT

A vehicle control apparatus is mounted on a vehicle including an emergency stop function to detect an abnormal state of a driver and automatically stop the vehicle. The vehicle control apparatus provides control at a time of stopping the vehicle and includes process execution sections and a process stop section. The process execution sections perform predetermined emergency processes in response to the emergency stop function stopping the vehicle; the emergency processes control instruments mounted on the vehicle and use a battery of the vehicle as a driving power source. The process stop section stepwise stops at least part of the emergency processes performed by the process execution sections based on a predetermined stop sequence.

25 Claims, 8 Drawing Sheets

(51) Int. Cl.
  *G05D 1/00* (2006.01)
  *B60W 10/20* (2006.01)
  *B60W 30/09* (2012.01)
  *B60W 50/12* (2012.01)
  *B60W 40/08* (2012.01)
  *B60W 50/14* (2012.01)

(52) U.S. Cl.
  CPC ............ *B60W 40/08* (2013.01); *B60W 50/12* (2013.01); *B60W 50/14* (2013.01); *G05D 1/0061* (2013.01); *G05D 1/0088* (2013.01); *G05D 1/0248* (2013.01); *G05D 1/0255* (2013.01); *B60W 2040/0818* (2013.01); *B60W 2050/143* (2013.01); *B60W 2050/146* (2013.01); *B60W 2420/42* (2013.01); *B60W 2420/54* (2013.01); *B60W 2420/62* (2013.01); *B60W 2510/20* (2013.01); *B60W 2510/244* (2013.01); *B60W 2520/10* (2013.01); *B60W 2540/10* (2013.01); *B60W 2540/26* (2013.01); *B60W 2550/12* (2013.01); *B60W 2560/02* (2013.01); *B60W 2710/18* (2013.01); *B60W 2710/20* (2013.01); *B60W 2720/10* (2013.01); *G05D 2201/0213* (2013.01)

(58) Field of Classification Search
  CPC .......... G05D 2201/0213; B60W 10/18; B60W 10/20; B60W 30/09; B60W 50/12; B60W 40/08; B60W 50/14; B60W 2040/0818; B60W 2420/62; B60W 2420/54; B60W 2710/18; B60W 2710/20; B60W 2720/10; B60W 2510/244; B60W 2510/20; B60W 2520/10; B60W 2540/10; B60W 2540/26; B60W 2550/12; B60W 2560/02; B60W 2050/146; B60W 2050/143
  See application file for complete search history.

(56) References Cited

FOREIGN PATENT DOCUMENTS

| JP | 2008-37218 A | 2/2008 |
| JP | 2014-24368 A | 2/2014 |
| JP | 2014-58229 A | 4/2014 |

* cited by examiner

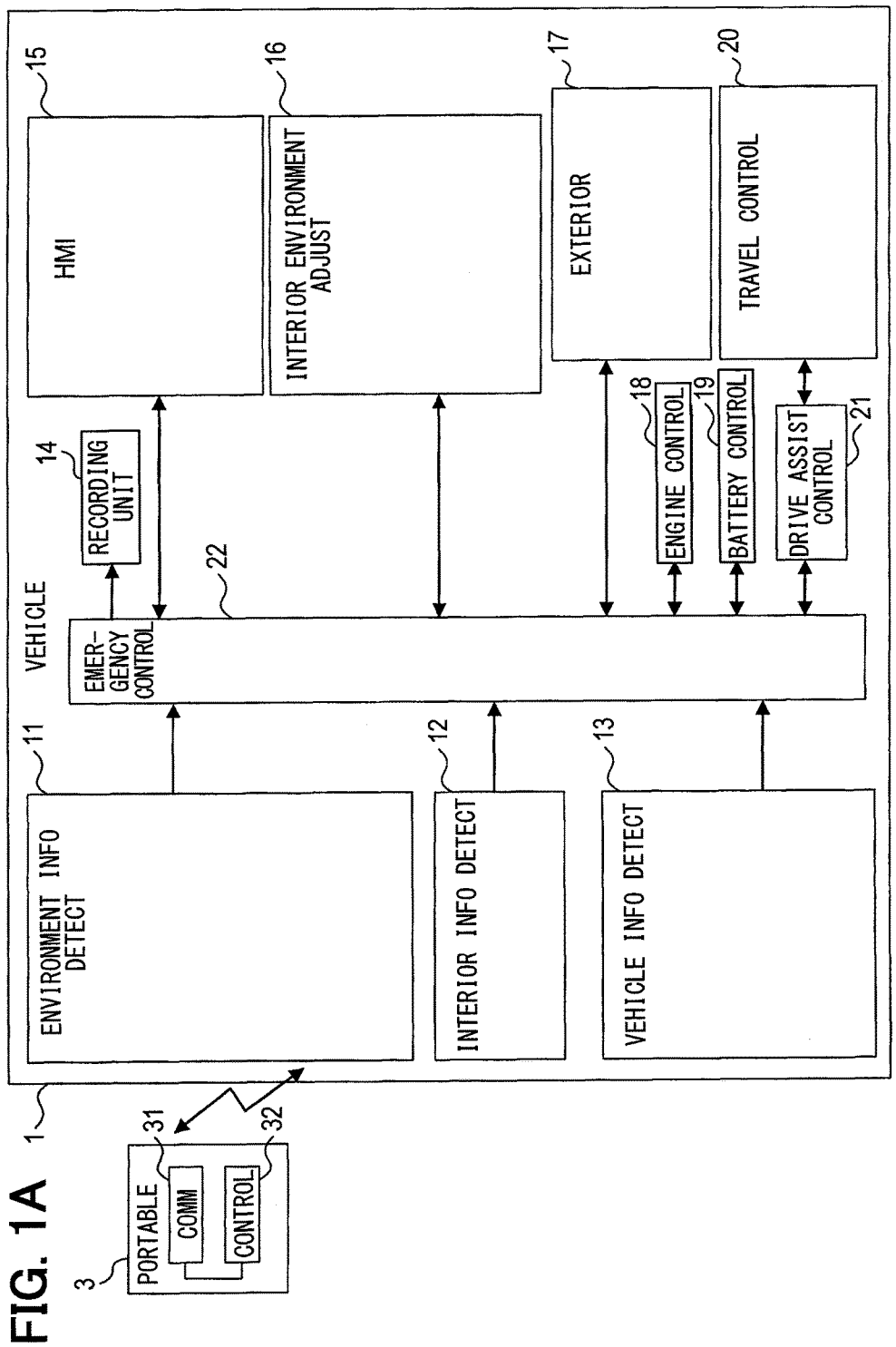

VEHICLE CONTROL APPARATUS

CROSS REFERENCE TO RELATED APPLICATION

The present application is based on Japanese Patent Application No. 2014-223019 filed on Oct. 31, 2014, the disclosure of which is incorporated herein by reference.

TECHNICAL FIELD

The present disclosure relates to a vehicle control apparatus that controls vehicle while stopped.

BACKGROUND ART

A publicly known technology automatically controls a vehicle in order to avoid a subsequent accident or a request for rescue when a driver driving a vehicle enters an abnormal state and the abnormality is detected. The vehicle control system described in patent literature 1 provides an emergency stop function to automatically stop a vehicle when detecting an abnormal state such as a heart failure on a driver. The vehicle control system uses a vehicle battery as a power source and performs an emergency process that notifies a vehicular surrounding of the driver's abnormality by using a sound or a turn signal lamp or reports the situation to a destination such as an emergency unit when the emergency stop function stops the vehicle.

PRIOR ART LITERATURES

Patent Literature

Patent literature 1: JP 2000-301963 A

SUMMARY OF INVENTION

According to the vehicle control system in patent literature 1, however, the battery may run down because the system endlessly performs several emergency processes that use the vehicle battery as a power source when the emergency stop function stops the vehicle. The battery running down causes the engine to fail to start even if the driver recovers from the abnormal state and tries to drive the vehicle.

Decreasing the number of emergency processes to be performed may save the battery consumption and increase the duration time of emergency processes. However, this may involve an emergency process that is not performed at all.

It is an object of the present disclosure to increase the duration time of emergency processes without decreasing the number of emergency processes that can be performed at the time a vehicle stops under a state where an abnormal state of a driver is detected and the vehicle stops automatically.

According to an example of the present disclosure, a vehicle control apparatus, which is mounted on a vehicle including an emergency stop function to detect an abnormal state of a driver and automatically stop the vehicle, is provided to include process execution sections and a process stop section. The process execution sections perform predetermined emergency processes in response to the emergency stop function stopping the vehicle; the emergency processes control instruments that are mounted on the vehicle and use a battery of the vehicle as a driving power source. The process stop section stepwise stops at least part of the emergency processes performed by the process execution sections based on a predetermined stop sequence. This configuration can increase the duration time of emergency processes without decreasing the number of emergency processes that can be performed at a time of stopping the vehicle.

BRIEF DESCRIPTION OF DRAWINGS

The above and other objects, features and advantages of the present disclosure will become more apparent from the following detailed description made with reference to the accompanying drawings. In the drawings:

FIG. 1A is a block diagram illustrating a configuration of a vehicle and a portable apparatus;

EMBODIMENTS FOR CARRYING OUT INVENTION

Embodiments of the present disclosure will be described with reference to the accompanying drawings.

[1. Configuration]

Figure 1B:
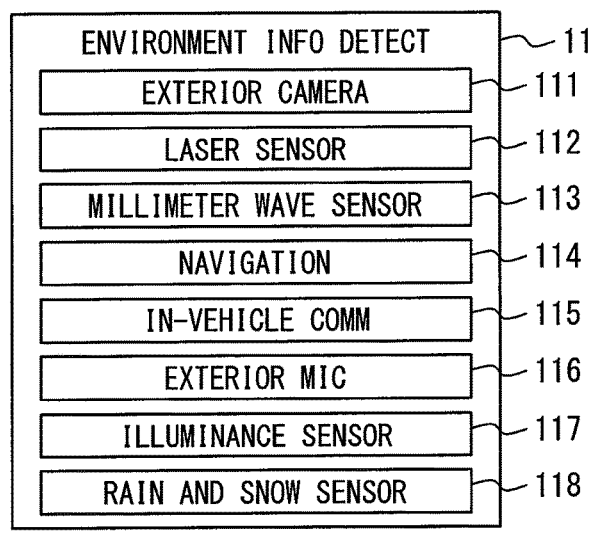
FIG. 1B is a block diagram illustrating a configuration of an environmental information detector.

As in FIG. 1A, a vehicle 1 according to the embodiment includes an environmental information detector 11, an interior information detector 12, a vehicle information detector 13, a recording unit 14, an HMI (Human Machine Interface) unit 15, an interior environment adjustor 16, exterior equipment 17, an engine control circuit 18, a battery control circuit 19, a travel control apparatus 20, a drive assist control circuit 21, and an emergency control circuit 22 connected to these elements. The vehicle 1 is also referred to as a host vehicle. The term "information" is used as a countable noun as well as an uncountable noun.

The environmental information detector 11 includes an exterior camera 111, a laser sensor 112, a millimeter wave sensor 113, a navigation apparatus 114, an in-vehicle communication instrument 115, an exterior microphone 116, an illuminance sensor 117, and a rain and snow sensor 118 (FIG. 1B) as apparatuses to detect an environment around the vehicle 1.

The exterior camera 111 includes a front camera to capture a scene ahead of the vehicle 1, a rightward camera to capture a scene to the right of the vehicle 1, a leftward camera to capture a scene to the left of the vehicle 1, and a rear camera to capture a scene behind the vehicle 1. The laser sensor 112 irradiates laser light as a transmission signal, receives laser light as a reception signal reflecting off an object around the vehicle 1, and detects the object reflecting the laser light based on the transmission signal and the reception signal. The millimeter wave sensor 113 irradiates a millimeter wave as a transmission signal, receives a millimeter wave as a reception signal reflecting off an object around the vehicle 1, and detects the object reflecting the millimeter wave based on the transmission signal and the reception signal.

The navigation apparatus 114 detects a position of the vehicle 1 specified by the latitude and the longitude based on a GPS signal received via a GPS (Global Positioning System) antenna. The navigation apparatus 114 stores map data and a variety of information. The map data includes classifications and position information about facilities, road information, and a variety of data needed to display the map. The road information is so detailed as to be capable of specifying to which lane of a road the vehicle 1 is positioned, based on the position of the vehicle 1. The navigation apparatus 114 according to the embodiment can detect a position of the vehicle 1 so accurately as to be capable of determining to which lane the vehicle 1 is positioned. The navigation apparatus 114 can specify to which lane of a road the vehicle 1 is positioned, based on the position of the vehicle 1 and the road information.

The in-vehicle communication instrument 115 performs wireless communication with an external communication instrument by using a mobile telephone network and the Internet network. The in-vehicle communication instrument 115 also detects the radio wave strength of a received radio wave. The in-vehicle communication instrument 115 according to the embodiment performs wireless communication with a portable apparatus 3 to be described later. The exterior microphone 116 detects the sound around the vehicle 1. The illuminance sensor 117 is mounted on an instrument panel at the front of a driver's seat and detects the illuminance around the vehicle 1 and the illuminance in the interior of the vehicle 1. The rain and snow sensor 118 detects rain/snow (rain or snow) on a windshield of the vehicle 1. The description below uses the term "environmental information" to represent the information detected by an apparatus equipped for the environmental information detector 11.

Figure 1C:
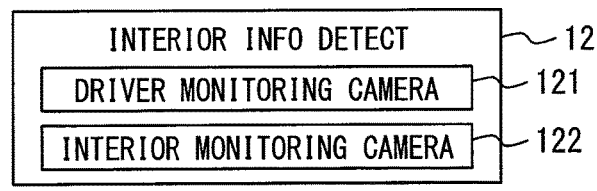
FIG. 1C is a block diagram illustrating a configuration of an interior information detector.

The interior information detector 12 includes a driver monitoring camera 121 and an interior monitoring camera 122 each as an apparatus to detect a situation in the interior of the vehicle 1 (FIG. 1C). The driver monitoring camera 121 is mounted in the instrument panel at the front of the driver's seat and captures a scene in front of the driver. The interior monitoring camera 122 is mounted on a ceiling in the interior of the vehicle 1 and captures a situation in the entire interior. The description below uses the term "interior information" to represent the information detected by an apparatus equipped for the interior information detector 12.

Figure 1D:
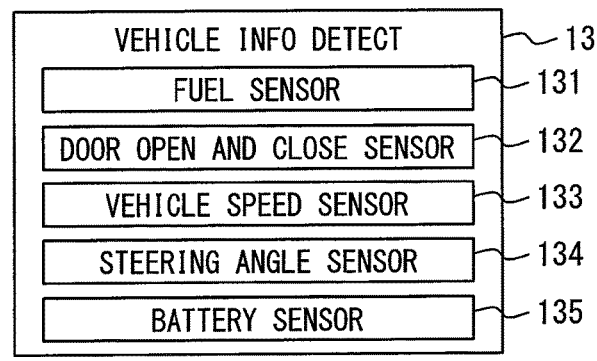
FIG. 1D is a block diagram illustrating a configuration of a vehicle information detector.

The vehicle information detector 13 includes a fuel sensor 131, a door opening and closing sensor 132, a vehicle speed sensor 133, a steering angle sensor 134, and a battery sensor 135 each as an apparatus to detect a situation of the vehicle (FIG. 1D). The fuel sensor 131 detects the remaining amount of fuel in the vehicle 1. The door opening and closing sensor 132 detects opened or closed status of a driver's seat door, a passenger seat door, and a rear seat door. The vehicle speed sensor 133 detects a speed of the vehicle 1. The steering angle sensor 134 detects a steering angle of a steering wheel.

The battery sensor 135 detects the remaining amount of a battery for the vehicle 1. The description below uses the term "vehicle information" to represent the information detected by an apparatus equipped for the vehicle information detector 13.

The recording unit 14 records a situation in the interior of the vehicle 1 and a situation around the vehicle 1.

Figure 1E:
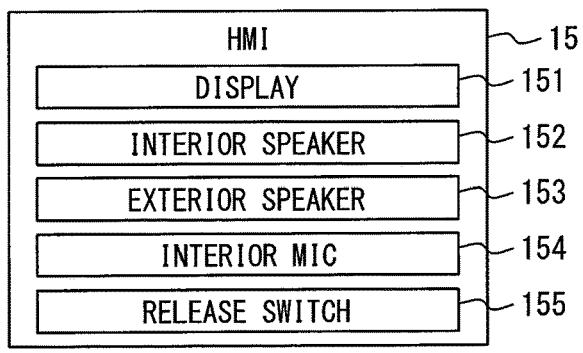
FIG. 1E is a block diagram illustrating a configuration of an HMI unit.

The HMI unit 15 includes a display unit 151, an interior speaker 152, an exterior speaker 153, an interior microphone 154, and a release switch 155 each as an apparatus to provide an interface for man-machine communication (FIG. 1E). The display unit 151 is mounted on the instrument panel at the front of the driver's seat and displays a variety of images. The interior speaker 152 is provided in the interior of the vehicle 1 and outputs a variety of audio to a driver. The exterior speaker 153 outputs a variety of audio to a vehicle or a pedestrian around the vehicle 1. The interior microphone 154 detects the sound in the interior of the vehicle 1.

The release switch 155 releases (terminates) emergency control mode. The emergency control mode starts when an abnormal state of the driver is detected. The emergency control mode causes the vehicle 1 to automatically run and then automatically stop and subsequently performs an emergency process(es) to be described later. The vehicle 1, while set in the emergency control mode, disables predetermined manipulation (e.g., driving of the vehicle 1) of the driver on the vehicle 1. The release switch 155 is located at a position that forces the driver to intentionally press the release switch 155. The release switch 155 according to the embodiment is mounted near an interior light provided on the ceiling of the vehicle 1.

Figure 1F:
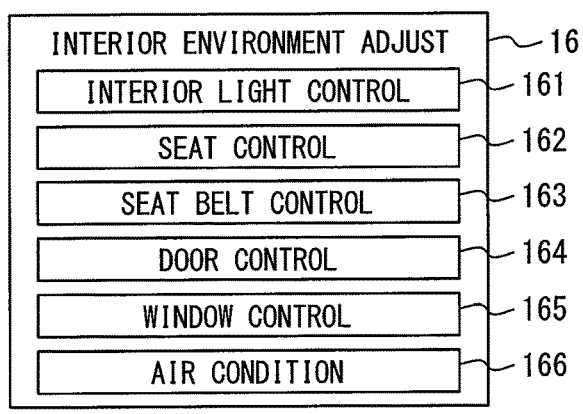
FIG. 1F is a block diagram illustrating a configuration of an interior environment adjustor.

The interior environment adjustor 16 includes an interior light control apparatus 161, a seat control apparatus 162, a seat belt control apparatus 163, a door control apparatus 164, a window control apparatus 165, and an air conditioner apparatus 166 each as an apparatus to adjust the interior environment of the vehicle 1 (FIG. 1F).

The interior light control apparatus 161 controls to activate or inactivate the interior light. The seat control apparatus 162 adjusts lengthwise positions and back angles of the driver's seat, the passenger seat, and the rear seat. The seat belt control apparatus 163 controls winding of a driver's seat belt, a passenger seat belt, and a rear seat belt. The door control apparatus 164 controls opening and closing of the driver's seat door, the passenger seat door, and the rear seat door and controls locking and unlocking of each door. The opening and closing here signifies transition from the opened state to the closed state and transition from the closed state to the opened state. The window control apparatus 165 controls opening and closing of a window provided for each of the driver's seat door, the passenger seat door, and the rear seat door. The air conditioner apparatus 166 adjusts the interior temperature of the vehicle 1.

Figure 1G:
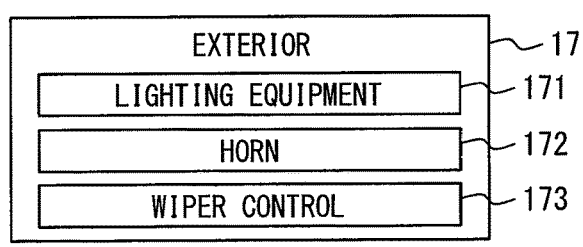
FIG. 1G is a block diagram illustrating a configuration of exterior equipment.

The exterior equipment 17 includes lighting hardware 171, a horn apparatus 172, and a wiper control apparatus 173 (FIG. 1G). The lighting hardware 171 signifies lighting equipment in general mounted on the vehicle 1 to illuminate the exterior and includes a headlight, a position lamp, and a hazard lamp, for example. The horn apparatus 172 is provided as an alarm apparatus to set off an alarm outside the vehicle. Manipulating a horn switch built in a steering wheel causes the horn apparatus 172 to generate a sound (horn). The wiper control apparatus 173 controls wiper operations.

The engine control circuit 18 controls to start and stop the engine.

The battery control circuit 19 stops supplying power to an instrument (hereinafter referred to as an "in-vehicle instrument") that is mounted on the vehicle 1 and uses the battery of the vehicle 1 as a power supply for driving.

Figure 1H:
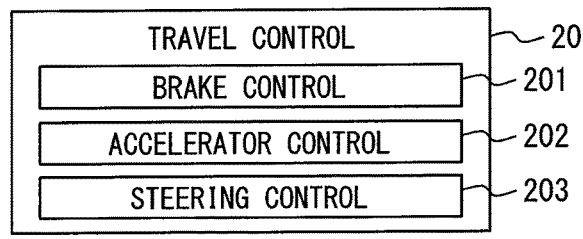
FIG. 1H is a block diagram illustrating a configuration of a travel control apparatus.

The travel control apparatus 20 includes a brake control apparatus 201, an accelerator control apparatus 202, and a steering control apparatus 203 (FIG. 1H). The brake control apparatus 201 controls a braking force applied to the vehicle 1. The accelerator control apparatus 202 controls an accelerator of the vehicle 1 to control a driving force applied to the vehicle 1. The steering control apparatus 203 controls the steering wheel of the vehicle 1.

The drive assist control circuit 21 is comparable to an electronic control unit. The drive assist control circuit 21 according to the embodiment is configured to include a publicly known microcomputer mainly including a CPU, ROM, and RAM, for example. The drive assist control circuit 21 causes the travel control apparatus 20 to control a controlled object and thereby enables the vehicle 1 to be capable of automatic travel and automatic stop. The drive assist control circuit 21 causes the emergency control circuit 22 to acquire images captured by the exterior camera 111 around the vehicle 1 and detection results from the laser sensor 112 and the millimeter wave sensor 113.

The emergency control circuit 22 is similar to an electronic control unit. The emergency control circuit 22 according to the embodiment is configured to include a publicly known microcomputer mainly including a CPU, ROM, and RAM, for example. The emergency control circuit 22 acquires environmental information from the environmental information detector 11, acquires interior information from the interior information detector 12, and acquires vehicle information from the vehicle information detector 13. The emergency control circuit 22 performs an emergency control process (FIGS. 2 through 4) and a situation recording process (FIG. 5) to be described later based on the acquired environmental information, interior information, and vehicle information.

Figure 6:
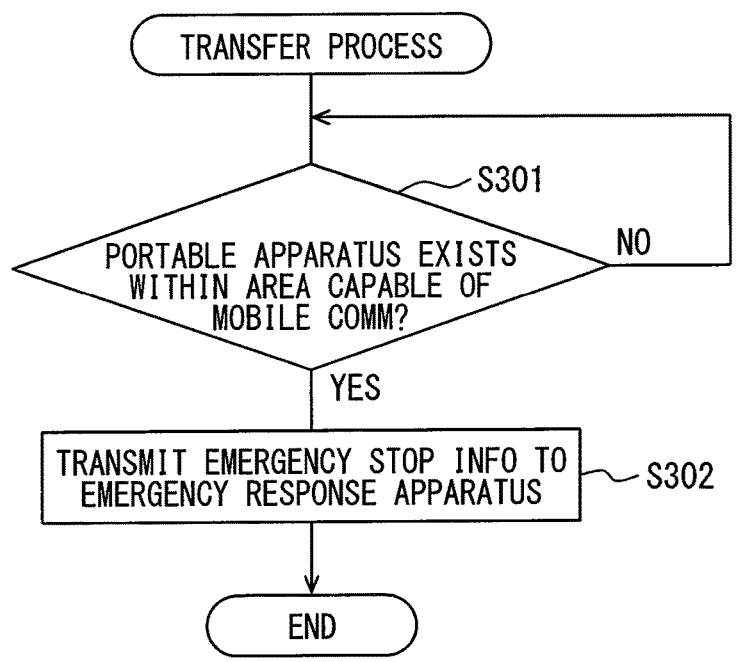
FIG. 6 is a flowchart illustrating a transfer process.

The portable apparatus 3 according to the embodiment includes a communication unit 31 and a control circuit 32 connected to each other. The communication unit 31 performs wireless communication with an external communication instrument via the mobile telephone network and the Internet network. The communication unit 31 also detects the radio field strength of a received radio wave. The control circuit 32 includes a publicly known microcomputer mainly including a CPU, ROM, and RAM. The control circuit 32 acquires the radio field strength from the communication unit 31 and performs a transfer process to be described later (FIG. 6).

[2. Processes]

Figure 2:
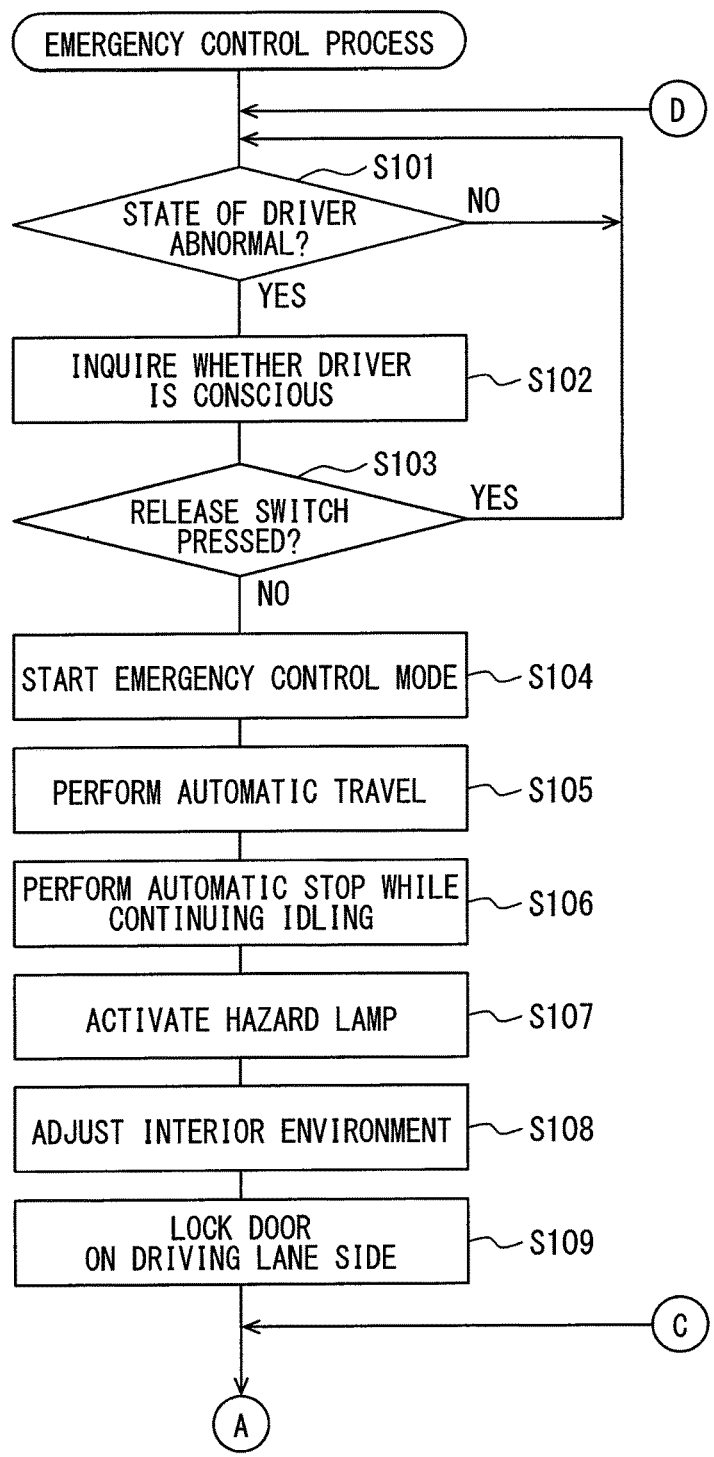
FIG. 2 is a flowchart (1) illustrating an emergency control process.
Figure 3:
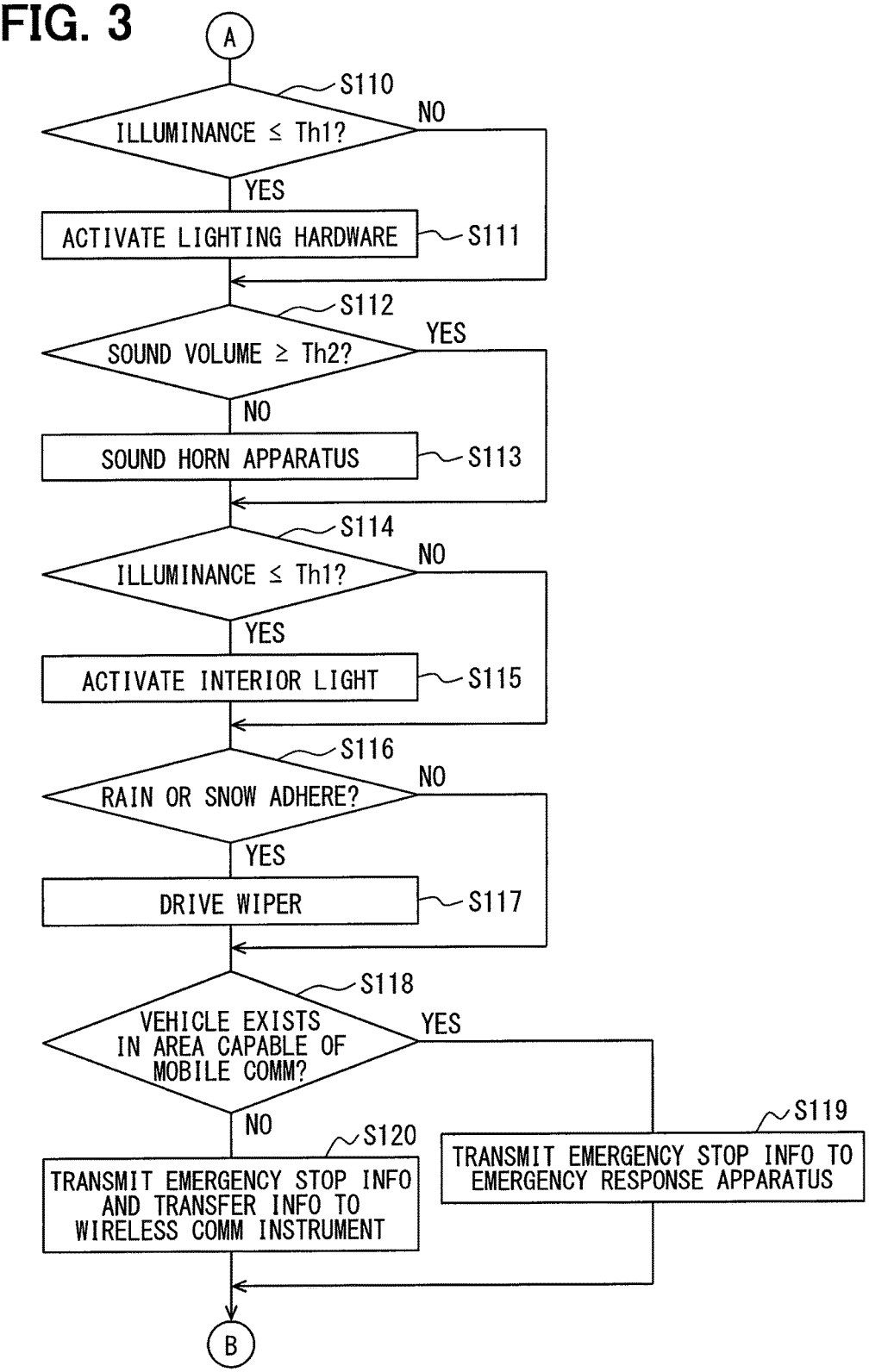
FIG. 3 is a flowchart (2) illustrating an emergency control process.
Figure 4:
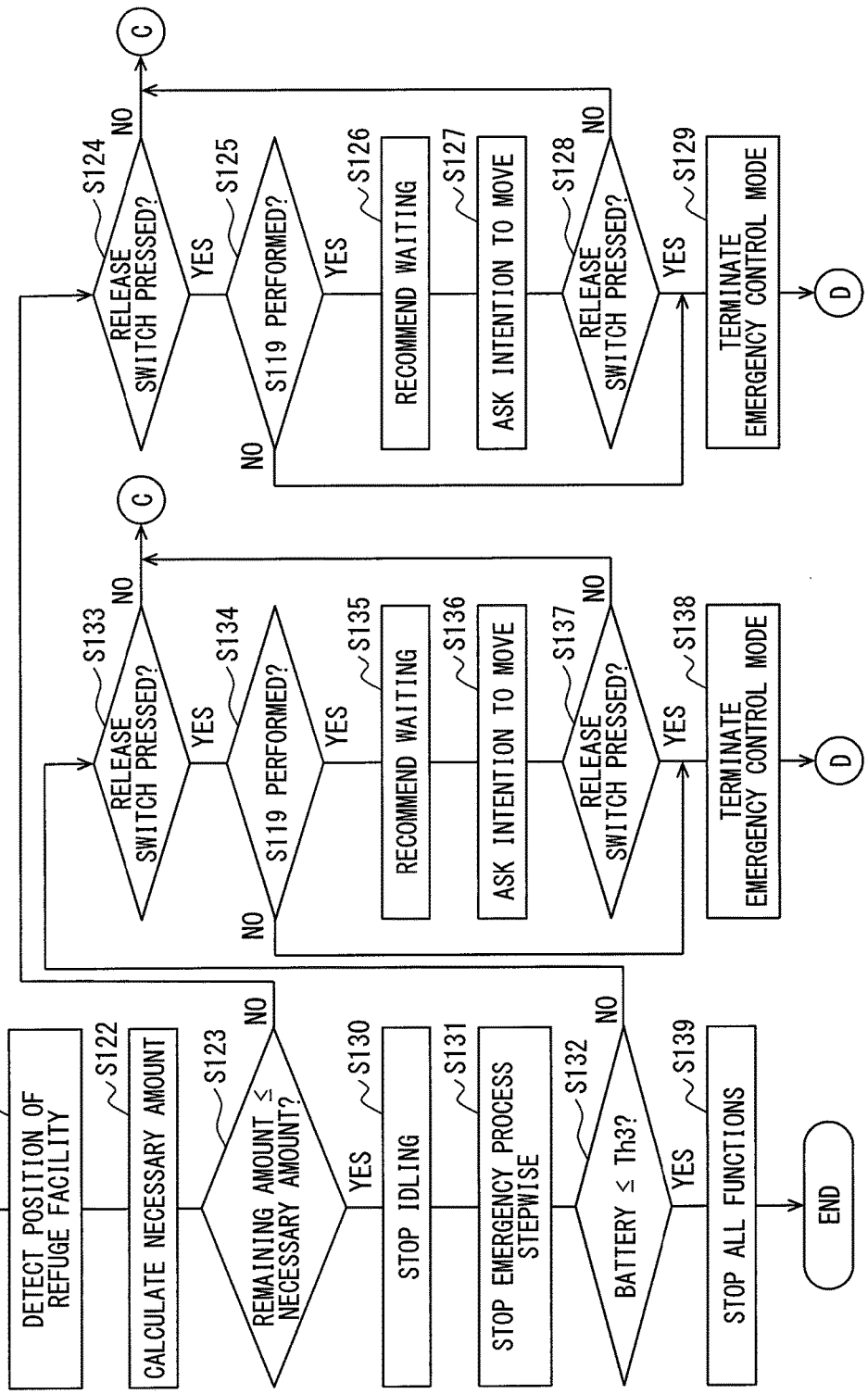
FIG. 4 is a flowchart (3) illustrating an emergency control process.

The description below explains an emergency control process performed by the emergency control circuit 22 with reference to flowcharts in FIGS. 2 through 4. The emergency control process starts when an ignition switch of the vehicle 1 is turned on.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device or a module, or, furthermore, referred to as a structure-modified specific name such as an idling continuator (S106) or an idling determinator (S121 through S123). Each or any combination of sections explained in the above can be achieved as (i) a software section in combination with a hardware unit (e.g., microcomputer) or (ii) a hardware section, including or not including a function of a related apparatus; furthermore, the hardware section (e.g., integrated circuit, hard-wired logic circuit) may be constructed inside of a microcomputer.

At S101, the emergency control circuit 22 determines whether the state of a driver is abnormal. The abnormal state of the driver here signifies a sudden change in the physical condition such as cardiopulmonary arrest or myocardial infarction or a drowse, for example. The emergency control circuit 22 determines that the state of the driver is abnormal when determining that the driver closes the eyes or does not face the front continuously for a predetermined time, based on a captured driver image acquired from the driver monitoring camera 121. The emergency control circuit 22 moreover determines that the state of the driver is abnormal when determining that the vehicle 1 is suddenly accelerated, based on the speed of the vehicle 1 acquired from the vehicle speed sensor 133. The emergency control circuit 22 furthermore determines that the state of the driver is abnormal when determining that the steering wheel is suddenly manipulated, based on a steering wheel angle acquired from the steering angle sensor 134. A sudden acceleration is assumed to occur when the driver inadvertently steps on the accelerator. A sudden change in the steering angle is assumed to occur when the driver leans against the steering wheel.

The emergency control circuit 22 repeats the process at S101 while determining that the state of the driver is not abnormal, i.e., the driver is normal (S101: NO). The emergency control circuit 22 may determine that the state of the driver is abnormal (S101: YES). In this case, the emergency control circuit 22 outputs an audio message that inquires the driver whether the driver is conscious (namely, confirms that the driver is conscious) (S102), and prompts the driver to press the release switch 155 when the driver is conscious. The interior speaker 152 outputs an audio message such as "Are you OK? Press the release switch 155."

The emergency control circuit 22 determines whether the release switch 155 is pressed (S103). The emergency control circuit 22 may determine that the release switch 155 is pressed (S103: YES). In this case, the emergency control circuit 22 returns to S101 and repeats the process at S101 and later.

The emergency control circuit 22 may determine that the release switch 155 is not pressed (S103: NO). In this case, the emergency control circuit 22 starts the emergency control mode (S104). When starting the emergency control mode, the emergency control circuit 22 causes the display unit 151 to display that the vehicle 1 enters the emergency control mode.

The emergency control circuit 22 outputs a directive to the drive assist control circuit 21 so that the automatic travel is performed on the vehicle 1. The emergency control circuit 22 thereby causes the drive assist control circuit 21 to perform the automatic travel on the vehicle 1 (S105). The drive assist control circuit 21 performs the automatic travel by recognizing the position of a white line ahead of the vehicle 1 or a vehicle around the vehicle 1 based on a captured image around the vehicle 1 captured by the exterior camera 111 and detection results from the laser sensor 112 and the millimeter wave sensor 113.

The emergency control circuit 22 outputs a directive to the drive assist control circuit 21 so that the automatic stop is performed on the vehicle 1. The drive assist control circuit 21 is caused to perform the automatic stop on the vehicle 1 while the vehicle 1 continues idling (S106). The drive assist control circuit 21 acquires the map data and the position of the vehicle 1 from the navigation apparatus 114 and causes the vehicle 1 to stop at a safe place (e.g., a road shoulder)

around the current position of the vehicle 1 based on the acquired information. The embodiment stops the vehicle 1 while the idling continues. The battery is therefore charged because the vehicle 1 consumes the fuel while the idling continues even after the vehicle 1 stops. The description below uses the term "emergency stop function" to represent the function of the vehicle 1 that detects an abnormal state of the driver and automatically stops the vehicle 1.

The emergency control circuit 22 activates the hazard lamp on the vehicle 1 (S107). The emergency control circuit 22 then causes the seat control apparatus 162, the seat belt control apparatus 163, the window control apparatus 165, and the air conditioner apparatus 166 to adjust the interior environment of the vehicle 1 (S108). The emergency control circuit 22 causes the seat control apparatus 162 to adjust the lengthwise position of the driver's seat and the back angle so that the driver can settle into a comfortable position. The emergency control circuit 22 causes the seat belt control apparatus 163 to control winding of the driver's seat belt so that the seat belt is loosened. The emergency control circuit 22 causes the window control apparatus 165 to open or close the window or causes the air conditioner apparatus 166 to adjust the interior temperature so that the interior temperature is comfortable when the interior temperature of the vehicle 1 is high or low.

The emergency control circuit 22 causes the door control apparatus 164 to lock the door of the vehicle 1 at the side of a driving lane in order to prevent the driver from inadvertently getting out of the vehicle 1 to the driving lane (S109). The emergency control circuit 22 determines at which lane of the road the vehicle 1 is positioned, based on the road information and the position of the vehicle 1 acquired from the navigation apparatus 114. The emergency control circuit 22 determines which of the right and left doors of the vehicle 1 corresponds to the driving-lane side. The embodiment locks the door at the driving-lane side so that the door cannot be opened from inside the vehicle but can be opened from outside the vehicle in order for a rescuer to open the door of the vehicle 1.

The emergency control circuit 22 determines whether the illuminance around the vehicle 1 is less than or equal to predetermined threshold value Th1, based on the illuminance around the vehicle 1 acquired from the illuminance sensor 117 (S110). Threshold value Th1 is specified based on the illuminance to make a distinction between day and night, for example. The emergency control circuit 22 may determine that the illuminance around the vehicle 1 is less than or equal to predetermined threshold value Th1, namely, now is night (S110: YES). The emergency control circuit 22 then activates the lighting hardware 171 (S111) and the process proceeds to S112. The emergency control circuit 22 may determine that the illuminance around the vehicle 1 is not less than or equal to predetermined threshold value Th1, namely, the present is not night (S110: NO). The process skips S111 and proceeds to S112.

At S112, the emergency control circuit 22 determines whether the sound volume around the vehicle 1 is greater than or equal to predetermined threshold value Th2, based on the sound around the vehicle 1 acquired from the exterior microphone 116 (S112). Threshold value Th2 is specified based on the sound volume to make a distinction between a sound volume with noise and a sound volume without noise. The emergency control circuit 22 may determine that the sound volume around the vehicle 1 is not larger than or equal to threshold value Th2, namely, determine that no noise exists around the vehicle 1 (S112: NO). In this case, the emergency control circuit 22 sounds the horn apparatus 172 (S113) and notifies outside the vehicle 1 that the vehicle 1 stops. The emergency control circuit 22 may determine that the sound volume around the vehicle 1 is greater than or equal to threshold value Th2, namely, determine that noise exists around the vehicle 1 (S112: YES). In this case, the process skips S113 and proceeds to S114.

At S114, the emergency control circuit 22 determines whether the interior illuminance of the vehicle 1 is lower than or equal to threshold value Th1, based on the interior illuminance of the vehicle 1 acquired from the illuminance sensor 117. Threshold value Th1 at S114 is equal to threshold value Th1 at S110. The emergency control circuit 22 may determine that the interior illuminance of the vehicle 1 is lower than or equal to threshold value Th1 (S114: YES). In this case, the emergency control circuit 22 causes the interior light control apparatus 161 to turn on the interior light (S115) and the process proceeds to S116. The emergency control circuit 22 may determine that the interior illuminance of the vehicle 1 is not lower than or equal to threshold value Th1 (S114: NO). In this case, the process skips S115 and proceeds to S116.

At S116, the emergency control circuit 22 determines whether rain or snow adheres to the windshield of the vehicle 1, based on the detection result acquired from the rain and snow sensor 118. The emergency control circuit 22 may determine that rain or snow adheres to the windshield of the vehicle 1 (S116: YES). In this case, the emergency control circuit 22 causes the wiper control apparatus 173 to drive the wiper (S117) and the process proceeds to S118. The emergency control circuit 22 may determine that neither rain nor snow adheres to the windshield of the vehicle 1 (S116: NO). In this case, the process skips S117 and proceeds to S118.

At S118, the emergency control circuit 22 determines whether the vehicle 1 exists in an area capable of mobile communication, based on a radio field strength acquired from the in-vehicle communication instrument 115. The area capable of mobile communication here signifies an area that enables communication using a mobile telephone. The emergency control circuit 22 may determine that the vehicle 1 exists in an area capable of mobile communication (S118: YES). In this case, the emergency control circuit 22 causes the in-vehicle communication instrument 115 to transmit emergency stop information to an emergency response apparatus outside the vehicle 1 (S119). The emergency stop information here represents at least the position of the vehicle 1. The emergency response apparatus corresponds to an apparatus comparable to transmission destination of the emergency stop information and is installed at an overall management center that overall manages the emergency stop information transmitted from several vehicles including the vehicle 1.

The emergency control circuit 22 may determine that the vehicle 1 does not exist in the area capable of mobile communication for mobile telephones (S118: NO). In this case, the emergency control circuit 22 causes the in-vehicle communication instrument 115 to transmit the emergency stop information and transfer information to a wireless communication instrument passing around the vehicle 1 (S120). The wireless communication instrument passing around the vehicle 1 includes a portable apparatus (such as a smartphone) carried by a person passing around the vehicle 1 or a communication instrument mounted on a vehicle passing around the vehicle 1, for example. The transfer information is to cause the wireless communication instrument to transfer the emergency stop information to the emergency response apparatus when the wireless communication instrument receives the transfer information and moves and enters the area capable of mobile communication. According to the embodiment, the portable apparatus 3 passing around the vehicle 1 receives the transfer information and performs a transfer process to be described later (FIG. 6) to transfer the emergency stop information to the emergency response apparatus.

The emergency control circuit 22 detects the position of a predetermined refuge facility from the position where the vehicle 1 stops based on the map data and the position of the vehicle 1 acquired from the navigation apparatus 114 (S121). According to the embodiment, the refuge facility corresponds to a facility (such as a hospital) where the driver can undergo medical treatment and a facility (such as a gas station) where the vehicle 1 can be refueled. The emergency control circuit 22 calculates the amount of fuel (necessary amount) needed for the vehicle 1 to travel from the position where the vehicle 1 stops to the position of the refuge facility detected at S121 (S122).

The emergency control circuit 22 determines whether the remaining amount of fuel is smaller than or equal to the necessary amount, based on the remaining amount of fuel acquired from the fuel sensor 131 (S123). The emergency control circuit 22 may determine that the remaining amount of fuel is not smaller than or equal to the necessary amount (S123: NO). In this case, the emergency control circuit 22 determines whether the release switch 155 is pressed (S124). The emergency control circuit 22 may determine that the release switch 155 is not pressed (S124: NO). In this case, the process returns to S110 and repeats S110 and later.

The emergency control circuit 22 may determine that the release switch 155 is pressed (S124: YES). In this case, the emergency control circuit 22 determines whether the emergency stop information is transmitted to the emergency response apparatus, namely, whether the process at S119 is performed (S125). The emergency control circuit 22 may determine that the process at S119 is performed (S125: YES). In this case, the emergency control circuit 22 causes the interior speaker 152 to output an audio message (namely, to recommend waiting) recommending that the driver does not move the vehicle 1 and waits at the position where the vehicle 1 stops (S126). For example, the interior speaker 152 outputs a message such as "Do not force to drive. Wait there." The emergency control circuit 22 then outputs an audio message asking whether the driver intends to move the vehicle 1 (namely, asking about the intention to move) (S127). The emergency control circuit 22 prompts the driver to press the release switch 155 if the driver intends to move the vehicle 1. For example, the interior speaker 152 outputs a message such as "To move, press the release switch 155."

The emergency control circuit 22 determines whether the release switch 155 is pressed (S128), and may determine that the release switch 155 is pressed (S128: YES). In this case, the emergency control circuit 22 terminates the emergency control mode (S129). The emergency control circuit 22 returns to S101 and repeats the process at S101 and later.

At S125, the emergency control circuit 22 may determine that the process at S119 is not performed (S125: NO). In this case, the process skips S126 through S128 and performs S129. The emergency control circuit 22 returns to S101 and repeats the process at S101 and later. Namely, a rescuer may or may not come because the emergency stop information is not transmitted to the emergency response apparatus. In such a case, the emergency control circuit 22 terminates the emergency control mode without causing the interior speaker 152 to output an audio message that recommends waiting or inquires about the presence or absence of an intention to move.

At S123, the emergency control circuit 22 may determine that the remaining amount of fuel is less than or equal to the necessary amount (S123: YES). In this case, the emergency control circuit 22 stops idling to save the fuel consumption (S130). The emergency control circuit 22 stepwise stops the emergency processes in accordance with the remaining amount of battery acquired from the battery sensor 135 (S131). Namely, the emergency control circuit 22 does not stop the emergency processes during idling and stepwise stops the emergency processes after the idling stops. The emergency processes here are performed by the emergency control circuit 22 to control the respective in-vehicle instruments when the emergency stop function stops the vehicle 1.

According to the embodiment, the emergency processes include a process to activate the interior light and the lighting hardware 171 provided for the vehicle 1, a process to sound the horn apparatus 172 of the vehicle 1, a process to drive the wiper of the vehicle 1, a process to transmit a wireless signal to ask for a rescue, a process to adjust the interior environment of the vehicle 1, a process to lock the door of the vehicle 1 at the driving-lane side, a process to open the window of the vehicle 1, a process to close the window of the vehicle 1, a process to cause the interior speaker 152 and the exterior speaker 153 to output an audio message, a process to record at least one of an interior situation of the vehicle 1 and a situation around the vehicle 1, and a process to transmit at least one of information about an interior situation of the vehicle 1 and information about a situation around the vehicle 1 to an information management center.

At S131, the emergency control circuit 22 preferentially continues the process to adjust the interior environment of the vehicle 1, the process to transmit a wireless signal to ask for a rescue, the process to record the situation, and the process to transmit the information each belonging to the emergency processes without stopping. Namely, the emergency control circuit 22 preferentially performs an emergency process that aims at protecting the life of a driver, asking for a rescue outside, or protecting things in the vehicle 1.

The emergency control circuit 22 sequentially stops the other emergency processes based on the following rule. Suppose a first emergency process and a second emergency process are performed. The second emergency process consumes the less battery power than the first emergency process. In this case, the emergency control circuit 22 stops the first emergency process and then the second emergency process. The emergency control circuit 22 stepwise stops the other emergency processes in descending order of the battery power consumption. According to the embodiment, the emergency control circuit 22 stops an emergency process to stop operation of a corresponding in-vehicle instrument.

The emergency control circuit 22 determines whether the remaining amount of the battery is smaller than or equal to predetermined amount Th3, based on the remaining amount of the battery acquired from the battery sensor 135 (S132). For example, predetermined amount Th3 is specified based on the amount needed to re-ignite the engine.

The emergency control circuit 22 may determine that the remaining amount of the battery is not smaller than or equal to predetermined amount Th3 (S132: NO). In this case, the emergency control circuit 22 performs the process at S133 through S138. S133 through S138 are equal to S124 through S129 and a description is omitted. The emergency control circuit 22 may determine that the remaining amount of the battery is smaller than or equal to predetermined amount Th3 (S132: YES). In this case, the emergency control circuit 22 stops all functions of the vehicle 1 (S139) and terminates the emergency control process. Stopping all functions of the vehicle 1 signifies forcing the state of the vehicle 1 into the state of the vehicle 1 that is normally available when the engine is off. Specifically, all emergency processes (including the emergency process aiming at protecting the life of the driver) stop.

Figure 5:
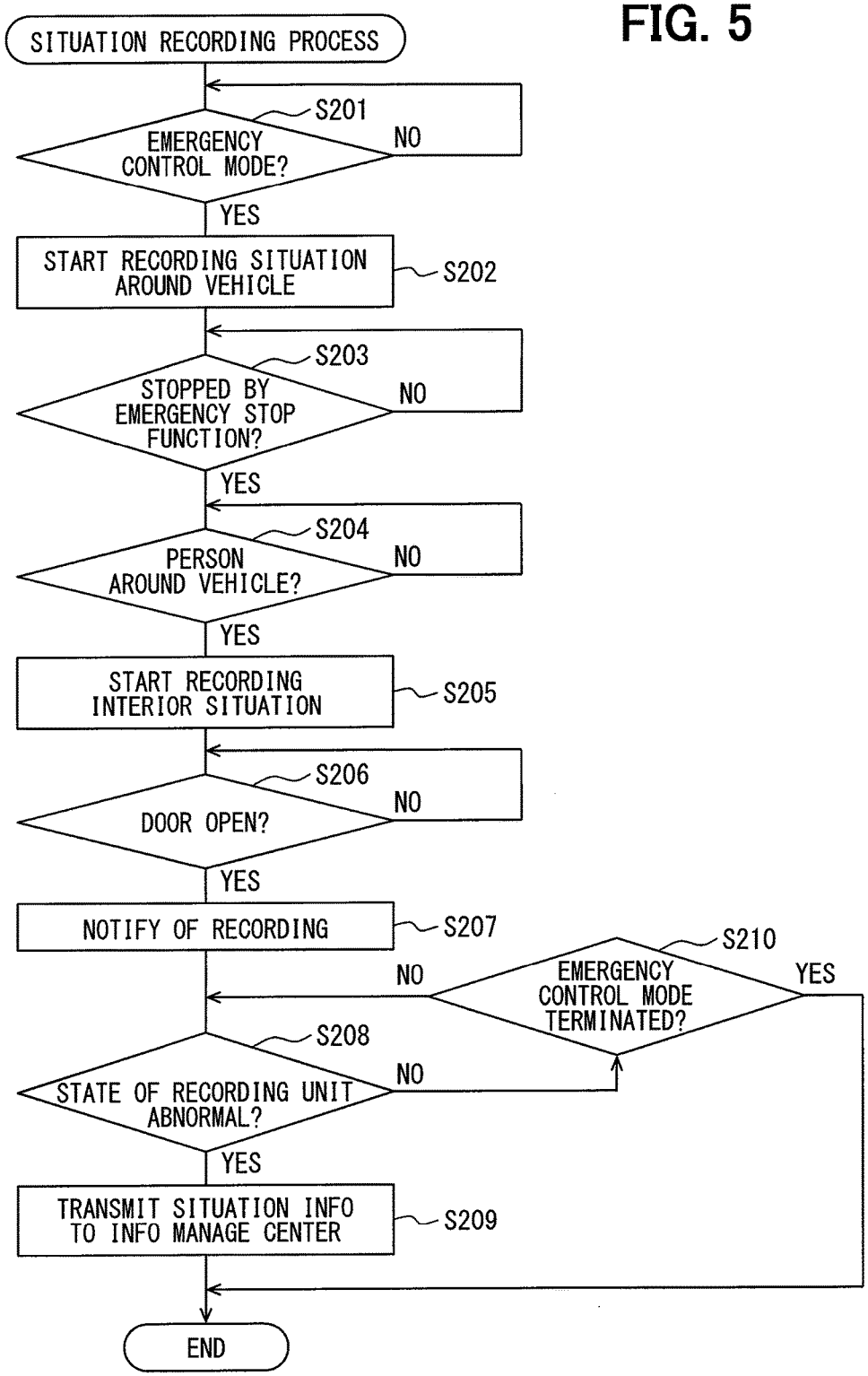
FIG. 5 is a flowchart illustrating a situation recording process.

The description below explains a situation recording process performed by the emergency control circuit 22 with reference to a flowchart in FIG. 5. The situation recording process starts when the ignition switch of the vehicle 1 is turned on. The situation recording process is performed concurrently with the emergency control process.

The emergency control circuit 22 determines whether the vehicle 1 enters the emergency control mode (S201). The emergency control circuit 22 repeats the process at S201 while determining that the vehicle 1 does not enter the emergency control mode (S201: NO). The emergency control circuit 22 may determine that the vehicle 1 enters the emergency control mode (S201: YES). In this case, the emergency control circuit 22 causes the recording unit 14 to start recording a situation around the vehicle 1 (S202). The recording unit 14 records images captured by the exterior camera 111 around the vehicle 1 and results detected by the laser sensor 112 and the millimeter wave sensor 113.

The emergency control circuit 22 determines whether the emergency stop function stops the vehicle 1 (S203). The emergency control circuit 22 repeats the process at S203 while determining that the emergency stop function does not stop the vehicle 1 (S203: NO).

The emergency control circuit 22 may determine that the emergency stop function stops the vehicle 1 (S203: YES). In this case, the emergency control circuit 22 determines whether there is a person around the vehicle 1 (S204). The person around the vehicle 1 is assumed to be an intruder who intends to intrude into the vehicle 1 for the purpose of robbery, for example. The emergency control circuit 22 repeats the process at S204 while determining that there is no person around the vehicle 1 (S204: NO). The emergency control circuit 22 may determine that there is a person around the vehicle 1 (S204: YES). In this case, the process causes the recording unit 14 to start recording an interior situation of the vehicle 1 (S205). The recording unit 14 records an image that represents the entire interior situation and is captured by the interior monitoring camera 122.

The emergency control circuit 22 determines whether any door of the vehicle 1 opens, based on a detection result acquired from the door opening and closing sensor 132 (S206). The emergency control circuit 22 repeats the process at S206 while determining that any door of the vehicle 1 does not open (S206: NO).

The emergency control circuit 22 may determine that any door of the vehicle 1 opens (S206: YES). In this case, the emergency control circuit 22 causes the interior speaker 152 and the exterior speaker 153 to output an audio message notifying that the situation around the vehicle 1 and the interior situation of the vehicle 1 are recorded (S207). The door of the vehicle 1 may be opened by an intruder as above, for example. The audio message is output at S207 to alert the intruder.

The emergency control circuit 22 determines whether the state of the recording unit 14 is abnormal (S208). According to the embodiment, the emergency control circuit 22 determines that the state of the recording unit 14 is abnormal when the recording unit is damaged. The recording unit 14 may be damaged by an intruder, for example.

The emergency control circuit 22 may determine that the state of the recording unit 14 is abnormal (S208: YES). In this case, the emergency control circuit 22 causes the in-vehicle communication instrument 115 to transmit situation information to the information management center (S209) and terminates the situation recording process. The situation information represents the interior situation of the vehicle 1 and the situation around the vehicle 1. The emergency control circuit 22 causes the in-vehicle communication instrument 115 to transmit the situation information capable of describing the situation that causes the state of the recording unit 14 to be abnormal.

The emergency control circuit 22 may determine that the state of the recording unit 14 is not abnormal (S208: NO). In this case, the emergency control circuit 22 determines whether the emergency control mode terminates (S210). The emergency control circuit 22 may determine that the emergency control mode terminates (S210: YES). In this case, the emergency control circuit 22 terminates the situation recording process. The emergency control circuit 22 may determine that the emergency control mode does not terminate (S210: NO). In this case, the emergency control circuit 22 returns to S208 and repeats the process at S208 and later.

The description below explains a transfer process performed by the portable apparatus 3 with reference to a flowchart in FIG. 6. The transfer process is available by installing a dedicated application on an existing portable apparatus (such as a smartphone). The transfer process stars when receiving the emergency stop information and the transfer information from the vehicle 1.

The control circuit 32 determines whether the portable apparatus 3 exists within an area capable of mobile communication, based on a radio field strength acquired from the communication unit 31 (S301). The control circuit 32 repeats the process at S301 while determining that the portable apparatus 3 does not exist within the area capable of mobile communication (S301: NO). The control circuit 32 may determine that the portable apparatus 3 exists within the area capable of mobile communication (S301: YES). In this case, the control circuit 32 causes the communication unit 31 to transmit the emergency stop information to the emergency response apparatus (S302) and terminates the transfer process.

[3. Effects]

The embodiment described above in detail provides the following effects.

(3a) The embodiment can perform all emergency processes at the time point when the emergency stop function stops the vehicle 1. At least part of the emergency processes in progress stepwise stop in accordance with a predetermined stop sequence. The embodiment can therefore extend the emergency process duration without reducing the number of emergency processes executable at the time the vehicle stops. The embodiment stepwise stops the emergency processes in descending order of the battery power consumption except some processes and can therefore improve the effect of extending the emergency process duration. The embodiment preferentially performs the emergency processes aiming at protecting the life of a driver, requesting a rescue outside, and protecting things in the vehicle 1 and can therefore extend the duration of these processes.

(3b) According to the embodiment, the emergency control circuit 22 continues idling that charges the battery when the vehicle 1 stops. The embodiment can therefore extend the emergency process duration in comparison with the case of not continuing idling when the vehicle stops.

(3c) According to the embodiment, the emergency control circuit 22 calculates the amount of fuel (necessary amount) needed for the vehicle 1 to travel from the position of the vehicle 1 stopped by the emergency stop function to the nearest refuge facility from the stop position. The emergency control circuit 22 stops idling when the remaining amount of fuel for the vehicle 1 is smaller than or equal to the necessary amount in order to save the fuel consumption. The embodiment ensures the fuel for the vehicle 1 to travel from the stop position to the refuge facility on condition that the remaining amount of fuel is larger than or equal to the necessary amount when the emergency stop function stops the vehicle 1. The driver can drive the vehicle 1 and move to the refuge facility when the driver recovers from an abnormal state. According to the embodiment, the refuge facility includes a facility (such as a hospital) to cure the driver or a facility (such as a gas station) to refuel the vehicle 1. The vehicle 1 can therefore travel to such a facility when the driver recovers from an abnormal state.

(3d) According to the embodiment, the emergency control circuit 22 activates the lighting hardware 171 at night and sounds the horn apparatus 172 when there is no noise around the vehicle 1. Namely, the emergency control circuit 22 determines whether to activate an alarm instrument such as the lighting hardware 171 or the horn apparatus 172, based on a situation around the vehicle 1. The embodiment can therefore activate an alarm instrument that is more effective in alarming outside the vehicle 1 and can save the battery consumption by not activating an alarm instrument that is less effective in alarming.

(3e) According to the embodiment, the emergency control circuit 22 activates the interior light when the interior illuminance of the vehicle 1 is lower than or equal to threshold value Th1. The embodiment can therefore make the interior situation (such as the state of a driver) of the vehicle 1 easily visible from outside the vehicle 1 even if the interior of the vehicle 1 is dark. The emergency control circuit 22 drives the wiper when rain or snow adheres to the windshield. The embodiment can therefore make the interior situation of the vehicle 1 easily visible from outside the vehicle 1 even if it rains or snows.

(3f) According to the embodiment, the emergency control circuit 22 causes the in-vehicle communication instrument 115 to transmit the emergency stop information to the emergency response apparatus when the vehicle 1 exists in an area capable of mobile communication. However, the emergency control circuit 22 causes the in-vehicle communication instrument 115 to transmit the emergency stop information and the transfer information to the wireless communication instrument passing around the vehicle 1 when the vehicle 1 does not exist in the area capable of mobile communication. The embodiment can therefore transmit the emergency stop information to the emergency response apparatus via the wireless communication instrument passing around the vehicle 1 even if the emergency stop information cannot be directly transmitted to the emergency response apparatus because the vehicle 1 does not exist in the area capable of mobile communication.

(3g) According to the embodiment, the emergency control circuit 22 causes an audio message to be output so as to recommend that the driver does not move the vehicle 1 and waits at the position where the vehicle 1 stops when the release switch 155 is pressed after the emergency stop information is transmitted to the emergency response apparatus. The embodiment can therefore increase the possibility that the driver avoids forced driving and waits until the rescue arrives when the driver does not fully recover from an abnormal state.

(3h) According to the embodiment, the emergency control circuit 22 causes the recording unit 14 to record the interior situation of the vehicle 1 and a situation around the vehicle 1. The embodiment can therefore discourage an intruder from committing a crime such as intruding into the vehicle 1 for the purpose of robbery and can consequently protect the driver and things in the vehicle 1. The embodiment outputs an audio to notify that the recording takes place when a door of the vehicle 1 is opened. The embodiment can further improve the effect of discouraging an intruder from committing a crime by alerting the intruder who opened the door.

(3i) The embodiment transmits the situation information (information representing an interior situation of the vehicle 1 and information representing a situation around the vehicle 1) recorded by the recording unit 14 to the information management center when the state of the recording unit 14 is abnormal. Particularly, the embodiment transmits the situation information descriptive of a situation that caused the state of the recording unit 14 to be abnormal. The situation information can expose the situation in which an outsider damaged the recording unit 14.

According to the embodiment, the emergency control circuit 22 corresponds to an example of the vehicle control apparatus that controls the vehicle to stop. The in-vehicle communication instrument 115, the recording unit 14, the interior speaker 152, the exterior speaker 153, the interior environment adjustor 16, and the exterior equipment 17 use the battery of the vehicle as a power supply for driving and each correspond to an example of the instrument mounted on the vehicle. The emergency control circuit 22 performs the processes that include sections functioning as follows. S107 through S120, S124 through S126, S133 through S135, S202, S205, and S209 correspond to an example of the process as a process execution section or a process executor. S131 corresponds to an example of the process as a process stop section or a process stopper. S106 corresponds to an example of the process as an idling continuation section or an idling continuator. S121 through S123 correspond to an example of the process as an idling determination section or an idling determinator. S130 corresponds to an example of the process as an idling stop section or an idling stopper.

S121 corresponds to an example of the process as a facility position detection section or a facility position detector. S122 corresponds to an example of the process as a calculation section or a fuel calculator. S123 corresponds to an example of the process as a fuel determination section or a fuel determinator. S110 through S113 correspond to an example of the process as a notification processing section or a notification processor.

The lighting hardware 171 and the horn apparatus 172 each correspond to an example of the alarm instrument. S110 and S112 correspond to an example of the process as an alarm determination section or an alarm determinator. S111 and S113 correspond to an example of the process as an alarm execution section or an alarm executor. The interior light and the lighting hardware 171 each correspond to an example of the process as the lighting equipment. S114 and S115 correspond to an example of the process as a lighting processing section or a lighting processor. S114 corresponds to an example of the process as an illuminance determination section or an illuminance determinator. S115 corresponds to an example of the process as a lighting execution section or a lighting executor.

S116 and S117 correspond to an example of the process as a drive processing section or a drive processor. S116 corresponds to an example of the process as a rain and snow determination section or a rain and snow determinator. S117 corresponds to an example of the process as a drive execution section or a drive executor. The in-vehicle communication instrument 115 corresponds to an example of the communication instrument. The emergency stop information and the transfer information each correspond to an example of the wireless signal used to request a rescue. S118 through S120 correspond to an example of the process as a rescue transmission processing section or a rescue transmission processor. S118 corresponds to an example of the process as a mobile communication determination section or a mobile communication determinator. S119 and S120 correspond to an example of the process as a rescue transmission execution section or a rescue transmission executor.

S124 through S126 and S133 through S135 correspond to an example of the process as an audio output processing section or an audio output processor. Pressing the release switch 155 corresponds to an example of the predetermined manipulation on the vehicle to stop all the emergency processes in progress. S124, S125, S133, and S134 correspond to an example of the process as a manipulation determination section or a manipulation determinator. S126 and S135 correspond to an example of the process as an audio output execution section or an audio output executor. The recording unit 14 corresponds to an example of the recording instrument. S202 and S205 correspond to an example of the process as a recording processing section or a recording processor. The in-vehicle communication instrument 115 corresponds to an example of an information transmission instrument. S209 corresponds to an example of the process as a situation transmission section or a situation transmitter.

[4. Other Embodiments]

While there has been described the embodiment of the present disclosure, the present disclosure is not limited to the above-mentioned embodiment but may be variously embodied.

(4a) The above-mentioned embodiment determines whether the state of the driver is abnormal, based on an image of the driver captured by the driver monitoring camera 121. However, the method of determining whether the state of the driver is abnormal is not limited thereto. For example, the driver's seat may be provided with an electrocardiographic sensor to detect an electrocardiographic signal from the driver. The state of the driver may be determined to be abnormal when an abnormality is detected in the electrocardiographic signal.

(4b) The above-mentioned embodiment causes the interior speaker 152 to output an audio to inquire the driver whether the driver is conscious when the state of the driver is determined to be abnormal. The method of inquiry is not limited thereto. For example, the display unit 151 may display a visual message to inquire whether the driver is conscious.

(4c) According to the above-mentioned embodiment, the emergency control circuit 22 determines which of right and left doors corresponds to the driving-lane side, based on the position of the vehicle 1 and the road information. However, other methods may be used for determination. For example, the vehicle 1 may be assumed to travel a lane on the road shoulder side. The door corresponding to the road shoulder side may be determined to differ from the door corresponding to the driving-lane side. The door opposite the road shoulder side may be simply determined to correspond to the driving-lane side.

The above-mentioned embodiment locks the door at the driving-lane side so that the door cannot be opened from the vehicle interior but can be opened from outside the vehicle, but is not limited thereto. The door at the driving-lane side may be locked so that the door cannot be opened from the vehicle interior nor from outside the vehicle. A rescuer may try to open the door at the driving-lane from outside the vehicle after the door is locked in this manner. In such a case, the emergency control circuit 22 may prompt the rescuer to open the unlocked door at the opposite side by using an audio from the exterior speaker 153.

(4d) According to the above-mentioned embodiment, pressing the release switch 155 releases the emergency control mode. However, the method of releasing the emergency control mode is not limited thereto. For example, the emergency control mode may be released by pressing a software switch displayed by the display unit 151. The emergency control mode may be released by inputting voice to the interior microphone 154. The emergency control mode may be released by performing several manipulations such as pressing the release switch 155 and inputting voice to the interior microphone 154.

(4e) The above-mentioned embodiment determines whether now is night, based on a detection value acquired from the illuminance sensor 117. However, the method of determining night is not limited thereto. For example, night may be determined based on that the time passes a predetermined time. Further, night may be determined based on that the position lamp of the vehicle 1 lights.

(4f) The above-mentioned embodiment uses the same illuminance threshold value Th1 to activate the lighting hardware 171 and the interior light, but is not limited thereto. Two different threshold values may be used. The above-mentioned embodiment uses one illuminance sensor 117 to detect the illuminance around the vehicle 1 and interior illuminance of the vehicle 1, but is not limited thereto. For example, different illuminance sensors may be used to detect the illuminance around the vehicle 1 and interior illuminance of the vehicle 1.

(4g) According to the above-mentioned embodiment, the emergency control circuit 22 determines whether to sound the horn apparatus 172, based on the presence or absence of noise around the vehicle 1. However, the determination criterion to sound the horn apparatus 172 is not limited thereto. For example, the emergency control circuit 22 may determine whether to sound the horn apparatus 172, based on the position of the vehicle 1 on the map. In this case, for example, the emergency control circuit 22 may determine that the horn apparatus 172 needs to sound when the emergency stop function stops the vehicle 1 at a place such as an urban area where a large crowd of people is gathered.

(4h) According to the above-mentioned embodiment, the emergency control circuit 22 activates the lighting hardware 171 at night and sounds the horn apparatus 172 when no noise exists around the vehicle 1. However, the method of causing the alarm instrument to generate alarm based on situations around the vehicle 1 is not limited thereto. For example, an alarm instrument mounted at the rear of the vehicle 1 may generate alarm when the vehicle 1 stops at a place (such as an expressway) that requires more attention to behind the vehicle 1 than attention to ahead of the vehicle 1. Suppose the vehicle 1 may stop at a place (such as a two-way street without medial strip) that requires generating alarm behind and ahead of the vehicle 1. In such a case, an alarm instrument mounted on the front of the vehicle 1 and an alarm instrument mounted on the rear of the vehicle 1 may generate alarm.

(4i) According to the above-mentioned embodiment, the lighting hardware 171 is activated to deliver notification outside the vehicle. However, the notification method is not limited thereto. For example, notification may be delivered by placing a display apparatus (such as an electronic message board) at a position of the vehicle 1 capable of being viewed from outside the vehicle. Notification may be delivered by using inter-vehicle communication to output audio from a speaker of a vehicle passing around the vehicle 1. Notification may be delivered by posting the emergency stop information to a community-based web site such as SNS (Social Networking Service) via the Internet network. Notification may be delivered by transmitting the emergency stop information to a road administrator of a public highway corporation so that a broadcast station can broadcast that the vehicle 1 stops. Notification may be delivered in such a manner that the in-vehicle communication instrument 115 transmits the emergency stop information to a communication instrument (such as a smartphone) carried by a driver of the vehicle 1 into the vehicle 1 and the communication instrument posts the emergency stop information outside the vehicle.

(4j) According to the above-mentioned embodiment, the emergency stop information represents at least a position of the vehicle 1 but is not limited thereto. For example, the emergency stop information may represent at least a position of the vehicle 1 and a state of a driver.

(4k) According to the above-mentioned embodiment, the recording unit 14 records an image captured by the exterior camera 111 around the vehicle 1. However, an object recorded by the recording unit 14 is not limited thereto. For example, the recording unit 14 may record sound detected by the exterior microphone 116 or the interior microphone 154.

(4l) The above-mentioned embodiment transmits the situation information (information representing the interior situation of the vehicle 1 and the situation around the vehicle 1) to the information management center when the state of the recording unit 14 is determined to be abnormal. However, transmission of the situation information is not limited thereto. For example, the situation information may be always transmitted to the information management center after a person is determined to exist around the vehicle 1. The above-mentioned embodiment transmits the situation information recorded by the recording unit 14 but is not limited thereto. For example, the situation around the vehicle 1 may be detected by the exterior camera 111 and may be transmitted immediately to transmit the situation information not recorded by the recording unit 14.

(4m) According to the above-mentioned embodiment, the recording unit 14 records the situation around the vehicle 1 and the interior situation of the vehicle 1 but is not limited thereto. The recording unit 14 may record only one of the situations.

(4n) According to the above-mentioned embodiment, the emergency control circuit 22 determines that the state of the recording unit 14 is abnormal when the recording unit 14 is damaged. However, the case of determining that the state of the recording unit 14 is abnormal is not limited thereto. For example, the state of the recording unit 14 may be determined to be abnormal when the amount of information recorded by the recording unit 14 exceeds a recordable limit.

(4o) According to the above-mentioned embodiment, the emergency process activates the interior light and the lighting hardware 171 provided for the vehicle 1 but is not limited thereto. For example, the emergency control circuit 22 may perform the emergency process to cause the door control apparatus 164 to unlock a door of the vehicle 1 when the door of the vehicle 1 is locked at the time a rescuer arrives.

(4p) According to the above-mentioned embodiment, the emergency control circuit 22 stops the emergency process to stop operation of the in-vehicle instrument. However, the method of stopping operation of the in-vehicle instrument is not limited thereto. For example, the battery control circuit 19 may stop supplying the power to the in-vehicle instrument to stop operation of the in-vehicle instrument.

(4q) According to the above-mentioned embodiment, the apparatus such as the lighting hardware 171 or the horn apparatus 172 continues operation (such as lighting or sounding) once the operation starts except that the operation is stepwise stopped at S131. However, the operation is not limited thereto. For example, suppose the illuminance around the vehicle 1 is determined to be lower than or equal to threshold value Th1 at S110, the lighting hardware 171 is turned on, the process at S110 is performed again, and then the illuminance around the vehicle 1 is determined to be not lower than or equal to threshold value Th1. In such a case, the lighting hardware 171 may be turned off.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A vehicle control apparatus that is mounted on a vehicle including an emergency stop function to detect an abnormal state of a driver and automatically stop the vehicle, the vehicle control apparatus providing control at a time of stopping the vehicle, the vehicle control apparatus comprising:
a plurality of process execution sections that perform predetermined emergency processes in response to the emergency stop function stopping the vehicle,
the emergency processes controlling instruments that are mounted on the vehicle and use a battery of the vehicle as a driving power source;
a process stop section that stepwise stops at least part of the emergency processes performed by the process execution sections based on a predetermined stop sequence;
an idling continuation section that continues idling to charge the battery in response to the emergency stop function stopping the vehicle;
an idling determination section that determines whether to stop the idling continued by the idling continuation section, based on a remaining amount of fuel in the vehicle; and
an idling stop section that stops the idling in response to the idling determination section determining to stop the idling,
wherein the process stop section does not stop the emergency processes during the idling and stepwise stops at least part of the emergency processes based on the predetermined stop sequence after the idling stop section stops the idling.

2. The vehicle control apparatus according to claim 1, wherein:
the process execution sections include
- a first process execution section to perform a first emergency process and
- a second process execution section to perform a second emergency process that consumes less power of the battery than the first emergency process; and the process stop section stops the first emergency process and then stops the second emergency process.

3. The vehicle control apparatus according to claim 1, wherein the idling determination section includes:
a facility position detection section that detects a position of a predetermined refuge facility nearest to a position where the emergency stop function stops the vehicle;
a calculation section that calculates an amount of fuel needed by the vehicle to travel from a position of the vehicle stopped by the emergency stop function to a position of the refuge facility detected by the facility position detection section; and
a fuel determination section that determines whether the remaining amount of fuel in the vehicle is smaller than or equal to the amount of fuel calculated by the calculation section,
wherein the idling stop section stops the idling in response to the fuel determination section determining that the remaining amount of fuel in the vehicle is smaller than or equal to the amount of fuel calculated by the calculation section.

4. The vehicle control apparatus according to claim 3, wherein the refuge facility corresponds to at least either a facility capable of curing the driver or a facility capable of refueling the vehicle.

5. The vehicle control apparatus according to claim 1, wherein the process execution sections include a notification processing section that performs, among the emergency processes, a process to notify outside the vehicle that the emergency stop function stops the vehicle,
the notification processing section including:
- an alarm determination section that determines whether to cause an alarm instrument provided in the vehicle to deliver notification, based on a situation around the vehicle; and
- an alarm execution section that causes the alarm instrument to deliver notification in response to the alarm determination section determining that the alarm instrument is caused to deliver the notification.

6. The vehicle control apparatus according to claim 1, wherein the emergency processes performed by the process execution sections include at least one process among processes that are:
a process to activate lighting equipment provided in the vehicle;
a process to sound a horn of the vehicle;
a process to drive a wiper of the vehicle;
a process to transmit a wireless signal to request a rescue;
a process to adjust an interior environment of the vehicle;
a process to lock a door of the vehicle at a driving-lane side;
a process to open a window of the vehicle;
a process to close a window of the vehicle;
a process to cause a speaker of the vehicle to output an audio message;
a process to record at least either an interior situation of the vehicle or a situation around the vehicle; and
a process to transmit at least either information representing an interior situation of the vehicle or information representing a situation around the vehicle, to an information management center.

7. The vehicle control apparatus according to claim 1, wherein the process execution sections include a lighting processing section that performs, among the emergency processes, a process to activate an interior light of the vehicle,
the lighting processing section including:
- an illuminance determination section that determines whether an interior illuminance of the vehicle is lower than or equal to a predetermined threshold value; and
- a lighting execution section that activates an interior light in response to the illuminance determination section determining that the illuminance is lower than or equal to the threshold value.

8. The vehicle control apparatus according to claim 1, wherein the process execution sections include a drive processing section that performs, among the emergency process, a process to drive a wiper of the vehicle,
the drive processing section including:
- a rain and snow determination section that determines whether at least either rain or snow adheres to a windshield of the vehicle; and
- a drive execution section that drives the wiper in response to the rain and snow determination section determining that at least either rain or snow adheres to the windshield of the vehicle.

9. The vehicle control apparatus according to claim 1, wherein the process execution sections include a rescue transmission processing section that performs, among the emergency processes, a process to cause a communication instrument provided in the vehicle to transmit a wireless signal requesting a rescue.

10. The vehicle control apparatus according to claim 9, wherein the rescue transmission processing section includes:
a mobile communication determination section that determines whether the vehicle exists in an area capable of mobile communication enabling communication using a mobile telephone; and
a rescue transmission execution section,
wherein,
in response to the mobile communication determination section determining that the vehicle exists in the area capable of mobile communication,
the rescue transmission execution section causes the communication instrument to transmit,
to an emergency response apparatus,
emergency stop information representing at least a position of the vehicle,
the emergency response apparatus being as a transmission destination of the emergency stop information,
whereas
in response to the mobile communication determination section determining that the vehicle does not exist in the area capable of mobile communication,
the rescue transmission execution section causes the communication instrument to transmit,
to a wireless communication instrument,
the emergency stop information and information that causes the wireless communication instrument to transfer the emergency stop information to the emergency response apparatus in response to the wireless communication instrument moving and entering the area capable of mobile communication,
the wireless communication instrument being passing around the vehicle stopped by the emergency stop function.

11. The vehicle control apparatus according to claim 10, wherein the process execution sections include an audio output processing section that performs, among the emergency processes, a process to cause a speaker of the vehicle to output an audio message,
the audio output processing section including:
a manipulation determination section that determines whether a predetermined manipulation on the vehicle is performed to stop all the emergency processes in progress after the communication instrument transmits the emergency stop information to the emergency response apparatus; and
an audio output execution section that causes the speaker to output an audio message recommending the driver to wait at a position where the emergency stop function stops the vehicle without moving the vehicle, in response to the manipulation determination section determining that the manipulation is performed after the communication instrument transmits the emergency stop information to the emergency response apparatus.

12. The vehicle control apparatus according to claim 1, wherein the process execution sections include a recording processing section that performs, among the emergency processes, a process to cause a recording instrument provided in the vehicle to record at least either an interior situation of the vehicle or a situation around the vehicle.

13. The vehicle control apparatus according to claim 1, wherein the process execution sections include a situation transmission section that performs, among the emergency processes, a process to cause an information transmission instrument provided in the vehicle to transmit at least either information representing an interior situation of the vehicle or information representing a situation around the vehicle to an information management center,
the information transmission instrument being capable of transmitting information.

14. A vehicle control apparatus that is mounted on a vehicle including an emergency stop function to detect an abnormal state of a driver and automatically stop the vehicle, the vehicle control apparatus providing control at a time of stopping the vehicle,
the vehicle control apparatus comprising:
a plurality of process execution sections that perform predetermined emergency processes in response to the emergency stop function stopping the vehicle,
the emergency processes controlling instruments that are mounted on the vehicle and use a battery of the vehicle as a driving power source; and
a process stop section that stepwise stops at least part of the emergency processes performed by the process execution sections based on a predetermined stop sequence,
wherein the process execution sections include a rescue transmission processing section that performs, among the emergency processes, a process to cause a communication instrument provided in the vehicle to transmit a wireless signal requesting a rescue,
wherein the rescue transmission processing section includes:
a mobile communication determination section that determines whether the vehicle exists in an area capable of mobile communication enabling communication using a mobile telephone; and
a rescue transmission execution section,
wherein,
in response to the mobile communication determination section determining that the vehicle exists in the area capable of mobile communication,
the rescue transmission execution section causes the communication instrument to transmit,
to an emergency response apparatus,
emergency stop information representing at least a position of the vehicle,
the emergency response apparatus being as a transmission destination of the emergency stop information,
whereas
in response to the mobile communication determination section determining that the vehicle does not exist in the area capable of mobile communication,
the rescue transmission execution section causes the communication instrument to transmit,
to a wireless communication instrument,
the emergency stop information and information that causes the wireless communication instrument to transfer the emergency stop information to the emergency response apparatus in response to the wireless communication instrument moving and entering the area capable of mobile communication,
the wireless communication instrument being passing around the vehicle stopped by the emergency stop function.

15. The vehicle control apparatus according to claim 14, wherein:
the process execution sections include
a first process execution section to perform a first emergency process and
a second process execution section to perform a second emergency process that consumes less power of the battery than the first emergency process; and
the process stop section stops the first emergency process and then stops the second emergency process.

16. The vehicle control apparatus according to claim 14, further comprising:
an idling continuation section that continues idling to charge the battery in response to the emergency stop function stopping the vehicle;
an idling determination section that determines whether to stop the idling continued by the idling continuation section, based on a remaining amount of fuel in the vehicle; and
an idling stop section that stops the idling in response to the idling determination section determining to stop the idling,
wherein the process stop section does not stop the emergency processes during the idling and stepwise stops at least part of the emergency processes based on the predetermined stop sequence after the idling stop section stops the idling.

17. The vehicle control apparatus according to claim 16, wherein the idling determination section includes:
a facility position detection section that detects a position of a predetermined refuge facility nearest to a position where the emergency stop function stops the vehicle;

a calculation section that calculates an amount of fuel needed by the vehicle to travel from a position of the vehicle stopped by the emergency stop function to a position of the refuge facility detected by the facility position detection section; and a fuel determination section that determines whether the remaining amount of fuel in the vehicle is smaller than or equal to the amount of fuel calculated by the calculation section, wherein the idling stop section stops the idling in response to the fuel determination section determining that the remaining amount of fuel in the vehicle is smaller than or equal to the amount of fuel calculated by the calculation section.

18. The vehicle control apparatus according to claim 17, wherein the refuge facility corresponds to at least either a facility capable of curing the driver or a facility capable of refueling the vehicle.

19. The vehicle control apparatus according to claim 14, wherein the process execution sections include a notification processing section that performs, among the emergency processes, a process to notify outside the vehicle that the emergency stop function stops the vehicle, the notification processing section including:
 an alarm determination section that determines whether to cause an alarm instrument provided in the vehicle to deliver notification, based on a situation around the vehicle; and
 an alarm execution section that causes the alarm instrument to deliver notification in response to the alarm determination section determining that the alarm instrument is caused to deliver the notification.

20. The vehicle control apparatus according to claim 14, wherein the emergency processes performed by the process execution sections include at least one process among processes that are:
 a process to activate lighting equipment provided in the vehicle;
 a process to sound a horn of the vehicle;
 a process to drive a wiper of the vehicle;
 a process to transmit a wireless signal to request a rescue;
 a process to adjust an interior environment of the vehicle;
 a process to lock a door of the vehicle at a driving-lane side;
 a process to open a window of the vehicle;
 a process to close a window of the vehicle;
 a process to cause a speaker of the vehicle to output an audio message;
 a process to record at least either an interior situation of the vehicle or a situation around the vehicle; and
 a process to transmit at least either information representing an interior situation of the vehicle or information representing a situation around the vehicle, to an information management center.

21. The vehicle control apparatus according to claim 14, wherein the process execution sections include a lighting processing section that performs, among the emergency processes, a process to activate an interior light of the vehicle, the lighting processing section including:
 an illuminance determination section that determines whether an interior illuminance of the vehicle is lower than or equal to a predetermined threshold value; and
 a lighting execution section that activates an interior light in response to the illuminance determination section determining that the illuminance is lower than or equal to the threshold value.

22. The vehicle control apparatus according to claim 14, wherein the process execution sections include a drive processing section that performs, among the emergency process, a process to drive a wiper of the vehicle, the drive processing section including:
 a rain and snow determination section that determines whether at least either rain or snow adheres to a windshield of the vehicle; and
 a drive execution section that drives the wiper in response to the rain and snow determination section determining that at least either rain or snow adheres to the windshield of the vehicle.

23. The vehicle control apparatus according to claim 14, wherein the process execution sections include an audio output processing section that performs, among the emergency processes, a process to cause a speaker of the vehicle to output an audio message, the audio output processing section including:
 a manipulation determination section that determines whether a predetermined manipulation on the vehicle is performed to stop all the emergency processes in progress after the communication instrument transmits the emergency stop information to the emergency response apparatus; and
 an audio output execution section that causes the speaker to output an audio message recommending the driver to wait at a position where the emergency stop function stops the vehicle without moving the vehicle, in response to the manipulation determination section determining that the manipulation is performed after the communication instrument transmits the emergency stop information to the emergency response apparatus.

24. The vehicle control apparatus according to claim 14, wherein the process execution sections include a recording processing section that performs, among the emergency processes, a process to cause a recording instrument provided in the vehicle to record at least either an interior situation of the vehicle or a situation around the vehicle.

25. The vehicle control apparatus according to claim 14, wherein the process execution sections include a situation transmission section that performs, among the emergency processes, a process to cause an information transmission instrument provided in the vehicle to transmit at least either information representing an interior situation of the vehicle or information representing a situation around the vehicle to an information management center, the information transmission instrument being capable of transmitting information.

\* \* \* \* \*